(12) United States Patent
Andreani et al.

(10) Patent No.: US 6,175,450 B1
(45) Date of Patent: Jan. 16, 2001

(54) TRANSPARENT PHOTOCHROMIC ARTICLE INCLUDING AN ANTI-REFLECTION SURFACE COATING

(75) Inventors: Fabrizio Andreani, Parma; Lino Barbieri, Varese, both of (IT)

(73) Assignee: Sola International Holding LTD, Lonsdale (AU)

( * ) Notice: Under 35 U.S.C. 154(b), the term of this patent shall be extended for 0 days.

(21) Appl. No.: 09/117,276

(22) PCT Filed: Jan. 31, 1997

(86) PCT No.: PCT/AU97/00051

§ 371 Date: Nov. 10, 1998

§ 102(e) Date: Nov. 10, 1998

(87) PCT Pub. No.: WO97/28467

PCT Pub. Date: Aug. 7, 1997

(30) Foreign Application Priority Data

Jan. 31, 1996 (IT) ............................... MI96A00162

(51) Int. Cl.⁷ ................... G02B 1/10; F21V 9/04
(52) U.S. Cl. ............ 359/586; 359/580; 359/581; 359/588; 359/359
(58) Field of Search .................... 359/586, 580, 359/581, 588, 359

(56) References Cited

U.S. PATENT DOCUMENTS

| | | | |
|---|---|---|---|
| 4,802,755 | 2/1989 | Hensler | 359/241 |
| 4,852,974 | 8/1989 | Melzig et al. | 359/580 |
| 5,091,244 | * 2/1992 | Biornard | 359/586 |
| 5,130,183 | 7/1992 | Muromachi et al. | 428/216 |
| 5,270,858 | * 12/1993 | Dickey | 359/586 |
| 5,552,671 | 9/1996 | Parham et al. | 359/359 |
| 5,725,959 | 3/1998 | Terada et al. | 359/586 |

* cited by examiner

*Primary Examiner*—Thong Nguyen
*Assistant Examiner*—Jennifer Winstedt
(74) *Attorney, Agent, or Firm*—Burns, Doane, Swecker & Mathis, L.L.P.

(57) ABSTRACT

A transparent photochromic article including a transparent substrate including a photochromic material; and an anti-reflection surface coating thereon, produced with a plurality of overlapping layers incorporating, alternatively a first and second material having respectively higher and lower refractive indices, the anti-reflection coating including; a first layer including said first material having an optical thickness of about 20 to 45 nm; a second layer including said second material having an optical thickness of about 25 to 45 nm; a third layer including said first material having an optical thickness of about 220 to 250 nm; and a fourth layer including said second material having an optical thickness of about 95–115 nm.

6 Claims, 4 Drawing Sheets

TRANSPARENT PHOTOCHROMIC ARTICLE INCLUDING AN ANTI-REFLECTION SURFACE COATING

The present invention relates to transparent photochromic articles having anti-reflection surface coatings.

The transparent articles according to the present invention are preferably employed in the preparation of articles such as optical lenses, including spectacle lenses, ophthalmic or not, visors, shields, glass sheets, protective screens, and the like.

A well known difficulty of long standing in the art and in particular in the production of spectacle lenses, has been the dilemma of trying to achieve very good light transmission in the visible region (wavelength ($\lambda$)=400 to 700 nm), whilst adequately protecting the eye from harmful light transmission, in particular from ultraviolet (UV) rays.

The prior art suggests that the characteristics of transmission of light through an article are improved by applying an anti-reflection coating, generally including a plurality of thin layers of suitable materials, respectively of a low and high index of refraction, which increase the transmission in the range of the visible radiation whilst simultaneously reducing the quantity of light reflected from the substrate.

To adequately protect the eye from solar radiation, the prior art suggests instead incorporating into the substrate, either internally or on the surface, one or more so-called photochromic compounds which are able to "darken" the substrate to reduce the transmission whenever they are activated from solar radiation in the UV range (350 to 400 nm approx.).

In fact, in their "activated" state such compounds pass from colourless to coloured effectively filtering light at a wavelength corresponding to visible light (approximately 400 to 700 nm).

All the attempts carried out in the prior art to obtain a photochromic substrate having an anti-reflection surface coating, have however, up to now, inevitably encountered the unavoidable effect of reflecting or absorbing light impinging upon the article in the UV range (the photochromic activity region) and thus causing the article not to darken as much as normally required.

Accordingly, it remains a deficiency of the prior art to provide a transparent article which includes an anti-reflection surface coating that simultaneously provides adequate transmission of visible light and adequate characteristics of photochromaticity when it becomes illuminated by sun light.

Accordingly, it is an object of the present invention to overcome, or at least alleviate, one or more of the difficulties related to the prior art.

In accordance with the present invention, it has been found that these desired characteristics may be simultaneously achieved by suitably combining the optical thickness of the layers forming the anti-reflection coating.

Accordingly, in a first aspect of the present invention there is provided a transparent photochromic article including a transparent substrate including a photochromic material; and an anti-reflection surface coating produced with a plurality of overlapping layers incorporating, alternatively a first and a second material having respectively higher and lower refractive indices, the anti-reflection coating including a first layer including said first material having an optical thickness of approximately 20 to 45 nm;

a second layer including said second material having an optical thickness of approximately 25 to 45 nm;

a third layer including said first material having an optical thickness of approximately 220 to 250 nm; and a fourth layer including said second material having an optical thickness of approximately 95 to 115 nm.

As used herein, by the term "transparent substrate", we mean any form of transparent substrate, whether it be of glass or of plastic material.

As used herein, by the term "photochromic material" we mean a material that is able to reduce the quantity of the light transmitted by the substrate when exposed to solar radiation.

As used herein, by the term "optical thickness" we mean the thickness obtained by multiplying the physical thickness of the layer by the refractive index "n", of the material forming the same layer, measured at a wavelength ($\lambda$) of 500 nm.

After repeated tests, the Applicants have found that when the layers of the anti-reflection coating have an optical thickness which falls within the above mentioned ranges, the reflection of the incident radiation on the substrate is minimal in the wavelength range required to activate the photochromic mixtures incorporated in, or deposited on, the substrate (approximately 350 to 400 nm) and sufficiently reduced in the visible range (approximately 400 to 700 nm), so as to simultaneously provide adequate transmission and photochromaticity for the substrate.

In fact, in contradistinction to what has been taught in the prior art the Applicants have found that the mean reflectance at the external surface of the article in the UV range as a function of wavelength is not limited to greater than 4% of the incident radiation, and may be noticeably reduced and preferably is less than approximately 1% of the incident radiation.

As a consequence, the layers described in the present invention not only perform an efficient photoprotection action when exposed to solar radiation, but also present excellent characteristics of transmission of the light in non-activating radiation surroundings, i.e. in surroundings in which the article will tend to resume its unactivated state characteristics.

In accordance with the present invention, it has also been found that the same type of positive results may be achieved by varying the number of layers of the anti-reflection coating (and, that is, with a different optical structure), provided that the total optical thickness is maintained in the range of +/− approximately 10% of the four coating layers described above.

Accordingly, in a second aspect, the present invention provides a transparent photochromic substrate of the type mentioned above, wherein said anti-reflection coating includes a first layer including said first material having an optical thickness of approximately 20 to 40 nm;

a second layer including said second material having an optical thickness of approximately 40 to 55 nm;

a third layer including said first material having an optical thickness of approximately 65 to 85 nm;

a fourth layer including said second material having an optical thickness of approximately 30 to 45 nm;

a fifth layer including said first material having an optical thickness of approximately 50 to 65 nm; and a sixth layer including said second material having an optical thickness of approximately 110 to 135 nm.

The photochromic materials according to these aspects of the present invention may be selected from one or more of the group consisting of silver halides including mixed silver halides, anthraquinones, phthalocyanines, spiro-oxazines, chromenes, pyrans including spiro-pyrans and fulgides. The photochromic materials may be incorporated into the monomer formulation used to produce a polymer substrate layer or in the glass formulation used to produce a glass substrate or in coatings applied to substrates prior to the application of abrasion resistant or anti-reflective coatings.

Examples of preferred photochromic dyes may be selected from one or more of the group consisting of 1,3-dihydrospiro[2H-anthra[2,3-d]imidazole-2,1'-cyclohexane]-5,10-dione
1,3-dihydrospiro[2H-anthra[2,3-d]imidazole-2,1'-cyclohexane]-6,11-dione
1,3-dihydro-4-(phenylthio)spiro[2H-anthra'1,2-diimidazole-2,1'-cyclohexane]-6,11-dione
1,3-dihydrospiro[2-H-anthra[1,2-d]imidazole-2,1'-cycloheptane]-6,11-dione
1,3,3-trimethylspiro'indole-2,3'-[3H]naphtho[2,1-b]-1,4-oxazine]
2-methyl-3,3'-spiro-bi-[3H-naphtho[2,1-b]pyran] (2-Me)
2-phenyl-3-methyl-7-methoxy-8'-nitrospiro[4H-1-benzopyran-4,3'-[3H]naphtho][2,1-b]pyran
Spiro[2H-1-benzopyran-2,9'-xanthene]
8-methoxy-1',3'-dimethylspiro(2H-1-benzopyran-2,2'-(1'H)-quinoline
2,2'-Spiro-bi-[2H-1-benzopyran]
5'-amino-1',3',3'-trimethylspiro[2H-1-benzopyran-2,2'-indoline
Ethyl-β-methyl-β-(3',3'-dimethyl-6-nitrospiro(2H-1-benzopyran-2,2'-indolin-1'-yl)-propenoate
(1,3-propanediyl)bis[3',3'-dimethyl-6-nitrospiro[2H-1-benzopyran-2,2'-indoline]
3,3'-dimethyl-6-nitrospiro[2H-1-benzopyrao-2,2'-benzoxazoline]
6'-methylthio-3,3'-dimethyl-8-methoxy-6-nitrospiro[2H-1-benzopyran-2,2'-benzothiozoline]
(1,2-ethanediyl)bis[8-methoxy-3-methyl-6-nitrospiro[2H-1-benzopyran-2,2'-benzothiozoline]
N-N'-bis(3,3'-dimethyl-6-nitrospiro[2H-1-benzopyran-2,2'(3'H)-benzothioazol-6'-yl)decanediamide
-α-(2,5-dimethyl-3-furyl)thylidene(Z)-ethylidenesuccinic anhydride; α-(2,5-dimethyl-3-furyl)-α',δ-dimethylfulgide
2,5-diphenyl-4-(2'-chlorophenyl)imidazole
[(2',4'-dinitrophenyl)methyl]-1H-benzimidazole
N-N-diethyl-2-phenyl-2H-phenanthro[9,10-d]imidazol-2-amine
2-nitro-3-aminofluorene
2-amino-4-(2'-furanyl)6H-1,3-thiazine-6-thione
3,3-di(4-methoxyphenyl)-6-morpholino-3H-naphtho[2,1-b]pyran (Reversacol Corn Yellow)
3,3-di(4-methoxyphenyl)-3H-naphtho[2,1-b]pyran (Reversacol Tangerine)
2,2-di(4-methoxyphenyl)-5,6-dimethyl-2H-naphtho[2,1-b]pyran (Reversacol Berry Red)
1,3-dihydro-3,3-dimethyl-1-isobutyl-spiro[2H-indole-2,3'-[3H]naphth[2,1-b][1,4]oxazine] (Reversacol Oxford Blue)
1,3-dihydro-3,3-trimethyl-1-neopentyl-6'-(4-diethylaminophenyl)spiro[2H-indole-2,3'-[3H]naphth[2,1,b]oxazine] (Reversacol Sea Green)
1,3-dihydro-3,3-dimethyl-1-isobutyl-6'-(4-diethylaminophenyl)spiro[2H-indole-2,3'-[3H]naphth[2,1-b][1,4]oxazine] (Reversacol Aqua Green)
1,3-dihydro-3,3-dimethyl-1isobutyl-6'-indolino spiro[2H-indole-2,3'-[3H]naphth[2,1 -b][1,4]oxazine] (Reversacol Flat Purple)
1,3-dihydro-3,3-dimethyl-1-(2-phenylpropyl)-6'-indolino spiro[2H-indole-2,3'-[3H]naphth[2,1-b][1,4]oxazine] (Reversacol Storm Purple)
1,3-dihydro-3,3-dimethyl-1isobutyl-6'-piperidino spiro[2H-indole-2,3'-[3H]naphth[2,1 -b][1,4]oxazine] (Reversacol Plum Red)
1,3-dihydro-5-chloro-3,3-dimethyl-1isobutyl-6'-piperidino spiro[2H-indole-2,3'-3H]naphth[2,1-b][1,4]oxazine] (Reversacol Claret)

In a preferred aspect, one or both surfaces of the photochromic substrate may be subjected to a surface treatment to improve bondability and/or compatibility. The surface treatment may be selected from one or more of the group consisting of plasma discharge, corona discharge, glow discharge, ionising radiation, UV radiation, flame treatment and laser, preferably excimer laser treatment. The surface treatment, alternatively or in addition, may include incorporating another bonding layer, for example a layer including a metal or metal compound selected from the group consisting of one or more of Chromium, Nickel, Tin, Palladium, Silicon, and/or oxides thereof.

The transparent substrate according to these aspects of the present invention may include any transparent element of glass having a refractive index, measured at 500 nm of approximately 1.5 to 1.9 such as Crown glass (n=1.523), barium glass (n=1.6), titanium glass (n=1.7) and lanthanum glass (n=1.8 and 1.9), and in general any type of commonly used glass utilised for optical application.

Alternatively, the transparent substrate may include any transparent element of plastic material having a refractive index of approximately 1.5 and 1.7.

Preferably, said plastic material is chosen from the group; polymer and copolymer with acrylic base, polymethylmethacrylate, polycarbonate, polyol-allylcarbonate, esters of the cellulose, polyacrylate, polyvinyls, polystyrene, polyurethane and sulfur-containing materials, including thioacrylates and the like.

A diethyleneglycol-bis-allyl-carbonate commercially available under the denomination of CR39™ (PPG Industries Inc.), commonly used for the production of lenses, ophthalmic or not, for spectacles has been found to be suitable.

The transparent substrate may be formed from cross-linkable polymeric casting compositions, for example as described in the Applicants U.S. Pat. No. 4,912,155, U.S. patent application Ser. No. 07/781,392, Australian Patent Applications 50581/93 and 50582/93, and European Patent Specification 453159A2, the entire disclosures of which are incorporated herein by reference.

For example, in Australian Patent Application 81216/87, the entire disclosure of which is incorporated herein by reference, the Applicant describes a cross-linkable casting composition including at least polyoxyalkylene glycol diacrylate or dimethacrylate and at least one poly functional unsaturated cross-linking agent.

Further, in Australian Patent Application 75160/91, the entire disclosure of which is incorporated herein by reference, the Applicants describe a polyoxyalkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

The range of optical lenses sold under the trade designation "Spectralite" by the Applicants have been found to be suitable.

The plastic material may include a photochromic dye which may, for example, be added to the monomer formulation used to produce the polymeric material. The variation in depth of colour may be minimised by incorporating a pigment or dye into one or more layers of the optical article.

Accordingly the transparent substrate may be of the type described in International Patent Application PCT/AU96/00704 and PCT/AU96/00705 "Light Transmissible Articles with Colour Enhancing Properties" and "Light Transmissible Article with Reduced Ultraviolet Transmission", respectively to the Applicants, the entire disclosures of which are incorporated herein by reference.

The front and/or rear lens surfaces may include an abrasion resistant coating. e.g. of the type described in U.S. Pat. No. 4,954,591 to the Applicants, the entire disclosure of which is incorporated herein by reference.

The front and/or rear lens surfaces may further include one or more additions conventionally used in casting compositions such as inhibitors, dyes including thermochromic and photochromic dyes, e.g. as described above, polarising agents, UV stabilisers and materials capable of modifying refractive index.

As stated above, the anti-reflection coating is formed from a first and second material in alternating layers.

Preferably, the above mentioned first material, has a refractive index of approximately 1.6 to 2.5 and even more favourably, between approximately 1.95 and 2.4.

The first material may be selected from the group which includes: $TiO_2$, $Ti_2O_3$, $Ti_3O_5$, $Pr_6O_{11}+xTiO_2$, $CeO_2$, $HfO_2$, $Ta_2O_5$, $ZrO_2$, $SnO_2$.

Preferably, the above mentioned second material, has a refractive index of approximately 1.30 to 1.48 and even more favourably, between approximately 1.38 to 1.48.

The second material may be selected from the group which includes: $SiO_2$, $MgF_2$, $AlF_3$, $BaF_2$, $Na_5Al_3F_{14}$, $Na_3AlF_6$, $YF_3$ and fluorocarbon compounds such as Teflon and the like.

Preferably, the anti-reflection coating further includes an intermediate layer of a material, between the substrate and the first layer of the coating.

Advantageously, the intermediate layer has the double function of giving to the substrate adequate characteristics of resistance to scratches and to guarantee an adequate adhesion of the subsequent thin layers that form the anti-reflection coating.

Preferably, the intermediate layer material has a refractive index lower than that of the substrate, or example approximately 1.38 to 1.48.

Furthermore and preferably, the intermediate layer has an optical thickness of approximately 200 to 300 nm and may be substantially made from $SiO_2$.

Alternatively, to improve the characteristics of adhesion it is possible to use a thin intermediate layer of a material chosen from metals or oxides of Cr, Ti, Sn, Pd and Si and having an optical thickness of approximately 1 to 5 nm.

Due to the limited thickness of this intermediate layer, the materials do not substantially compromise the optical performance of the anti-reflection coating applied to the substrate even though it has a high light absorption coefficient.

In accordance with the present invention and to any type of material used, the transparent substrate of the present invention may be used for the production of lenses or visors for spectacles, sheets, protection screens, etc. through well known surfacing techniques.

Moreover, according to the present invention, the anti-reflection coating may be applied to both sides of the uncoated substrate, optionally after surface treatment thereof.

When the transparent substrate is made of a plastic material, the anti-reflection coating is preferably formed on the surfaces of the substrate according to the process and the box coaters as described in the Italian Patent No. 1.244.374 the entire disclosure of which is incorporated herein by reference.

In accordance with said procedure, the various layers of the anti-reflection coating may be deposited in subsequent steps utilising a vacuum evaporation technique and exposing the growing layers to a bombardment of a beam of ions of inert gas.

Moreover, in accordance with the preferred process, the deposition of the layers may be achieved at a low temperature (generally below 80° C.), using an ion beam having a medium intensity (meaning the average number of ions that reach the substrate) included between approximately 30 and 100 $\mu$A/cm2 and the energy included between approximately 50 and 100 eV.

When the transparent substrate is made of glass, the anti-reflection coating may preferably be formed on the surface(s) of the substrate by vacuum evaporation to form the various layers of the anti-reflection coating and heating the substrate.

Preferably, the substrate is maintained at an elevated temperature during the deposition of the various layers of the anti-reflection coating.

According to the present invention it has been found that, following the procedures mentioned above, it is possible to achieve a relatively thin anti-reflection coating with consequent advantages in both optical and mechanical properties.

Further characteristics and advantages of the present invention will be apparent from the following description of a few examples of embodiments of the present invention, given as indicative but not restrictive, with reference to the attached Figures.

EXAMPLE 1

On 5 samples of BK7 glass panes and on a further 5 samples of photochromic lenses (to which PHOTOGREY EXTRA GRIS™ (Corning France S.A.) has previously been added) an anti-reflection coating which includes a hardcoating/adhesion layer of $SiO_2$ and further four overlapping layers, applying alternate layers of $Ti_3O_5$ (refractive index=2.39) and $SiO_2$ (refraction index=1.477).

All the glass panes have an opaque surface so enabling the measurement of the reflectance and show a reflective index of 1.52.

The formation of the layers of coating was carried out with a Satis 1200D coater (Satis Vacuum AG), commercially available and equipped with a Leybold electronic gun having a 4 kW power supply, an Ion Gun CSC Mark II, a system controlling the flow of oxygen by MKS and a system controlling the flow of argon by MKS.

The deposition parameters were as follows:

| | |
|---|---|
| initial vacuum | <$2.0^{-6}$ mbar; |
| temperature before deposition | <80° C. |

Moreover, the operating parameters of the ion gun were as follows:

| | |
|---|---|
| anode voltage | 80 V; |
| anode current | 2 A; |
| neutralising current | −0.15 A. |

The $SiO_2$ layers were deposited by regulating the power of the electronic gun to a value of approx. 20% of its maximum power and introducing oxygen with a flow of approx. 10 sccm.

During the deposition, the flow of argon was automatically regulated by the ion gun in respect of the current and voltage values used.

The speed of deposition of the layers was set at a value of approximately 1 nm/s.

The $Ti_3O_5$ layers were deposited by regulating the power of the electronic gun to a value of approx. 50% of its maximum power and introducing oxygen with a flow of approx. 50 sccm.

At the end of the deposition we achieved on each of the samples an anti-reflection coating having the composition illustrated in Table 1.

These samples then underwent the standard test to determine the reflectance curve as a function of the wavelength in the range between 350 and 700 nm using a HITACHI Mod. 3501 spectrophotometer.

Figure 1:
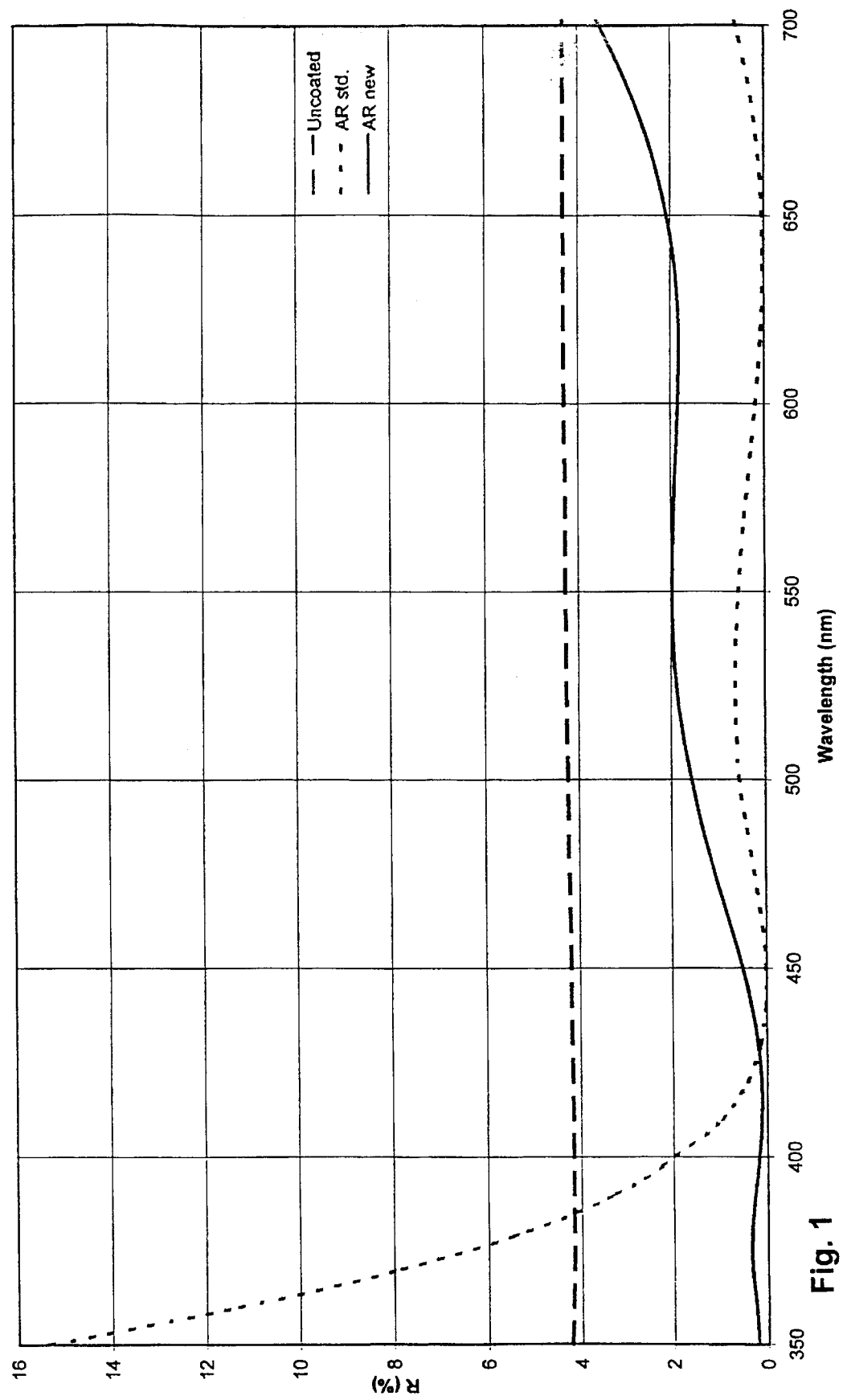
FIG. 1 illustrates the reflectance curves as a function of the wavelength for identical photochromic substrates: without anti-reflection coating, with an anti-reflection coating in accordance with known techniques and an anti-reflection coating according to the present invention.

The results of the measurements carried out are shown in the graph in FIG. 1 (#1 curve=uninterrupted line).

Furthermore, in the above mentioned FIG. 1, the #2 curve=interrupted line, illustrates the same curve for BK7 photochromic samples devoid of any anti-reflection coating.

EXAMPLE 2 (COMPARATIVE)

With the aim of comparing the anti-reflection coating of this invention to that of a standard type of coating, on 5 BK7 glass pane samples (n=1.52) having an opaque surface for the measurement of the reflectance, and on a further 5 samples of photochromic glass lenses (to which PHOTOGREY EXTRA GRIS™ (Corning France S.A.) has previously been added) an anti-reflection coating, according to the commercially known process known as SOLACOAT SUPER, was applied.

Said coating is made up of a layer of adhesion of Cr and four overlapping layers, applied alternatively of $Ti_3O_5$ (refractive index=2.39) and $SiO_2$ (refractive index=1.477).

The formation of the layers of coating was carried out with a Satis 1200D deposition machine (Satis Vacuum AG), commercially available and equipped with a Leybold electronic gun having a 4 kW power supply and a system controlling the flow of oxygen by MKS.

The deposition parameters were the following:

| | |
|---|---|
| initial vacuum | <$2.0^{-6}$ mbar; |
| temperature before deposition | <85° C. |

The $SiO_2$ layers were deposited by regulating the power of the electronic gun to a value of approx. 20% of its maximum power and introducing oxygen with a flow of approx. 10 sccm.

The speed of deposition of the layers was set at a value of approx. 1 nm/s.

The $Ti_3O_5$ layers were deposited by regulating the power of the electronic gun to a value of approx. 50% of its maximum power and introducing oxygen with a flow of approx. 50 sccm.

The speed of deposition of the layers was set at a value of approx. 0.3 nm/s.

At the end of the deposition we achieved on each of the samples an anti-reflection coating, according to standard techniques, having the composition illustrated in Table 2.

These samples then underwent the standard test to determine the reflectance curve as function of the wavelength in the range between 350 and 700 nm using a HITACHI Mod. 3501 spectrophotometer.

The results of the measurements carried out are shown in the graph in FIG. 1 (#3 curve=dotted line).

EXAMPLES 3–5

In utilising the process of Example 1 above, a series of photochromic lenses for spectacles were prepared which included an anti-reflection coating made of different transparent substrates.

In particular, the following type of lenses were used:

diethyleneglycol-bis-allyl-carbonate (CR 39™) having a refractive index equal to 1.5 at 500 nm, having a photochromic composition of oxazines and naphthopyrans, commercially available under the trademark Transitions (Transitions Optical Inc.), deposited on a portion of the surface of same (Example 2.);

a copolymer with an acrylic base, commercially available under the trademark Spectralite™ (Sola Optical), having a refractive index equal to 1.54 at 500 nm, incorporating the photochromic mixture known as Transitions™ (Transitions Optical Inc.), deposited on a portion of the surface of same (Example 3.);

glass having a refractive index equal to 1.6 at 500 nm, incorporating in mass a photochromic mixture owned by Corning France S.A. having the Trademark of PHOTOBROWN EXTRA which is mixed with the melted glass when cast (Example 4.).

An anti-reflection coating using the procedures and deposition machinery described in Example 1 was deposited out on the above described lenses so achieving an anti-reflection coating having the characteristics illustrated in Table 1.

Figure 2:
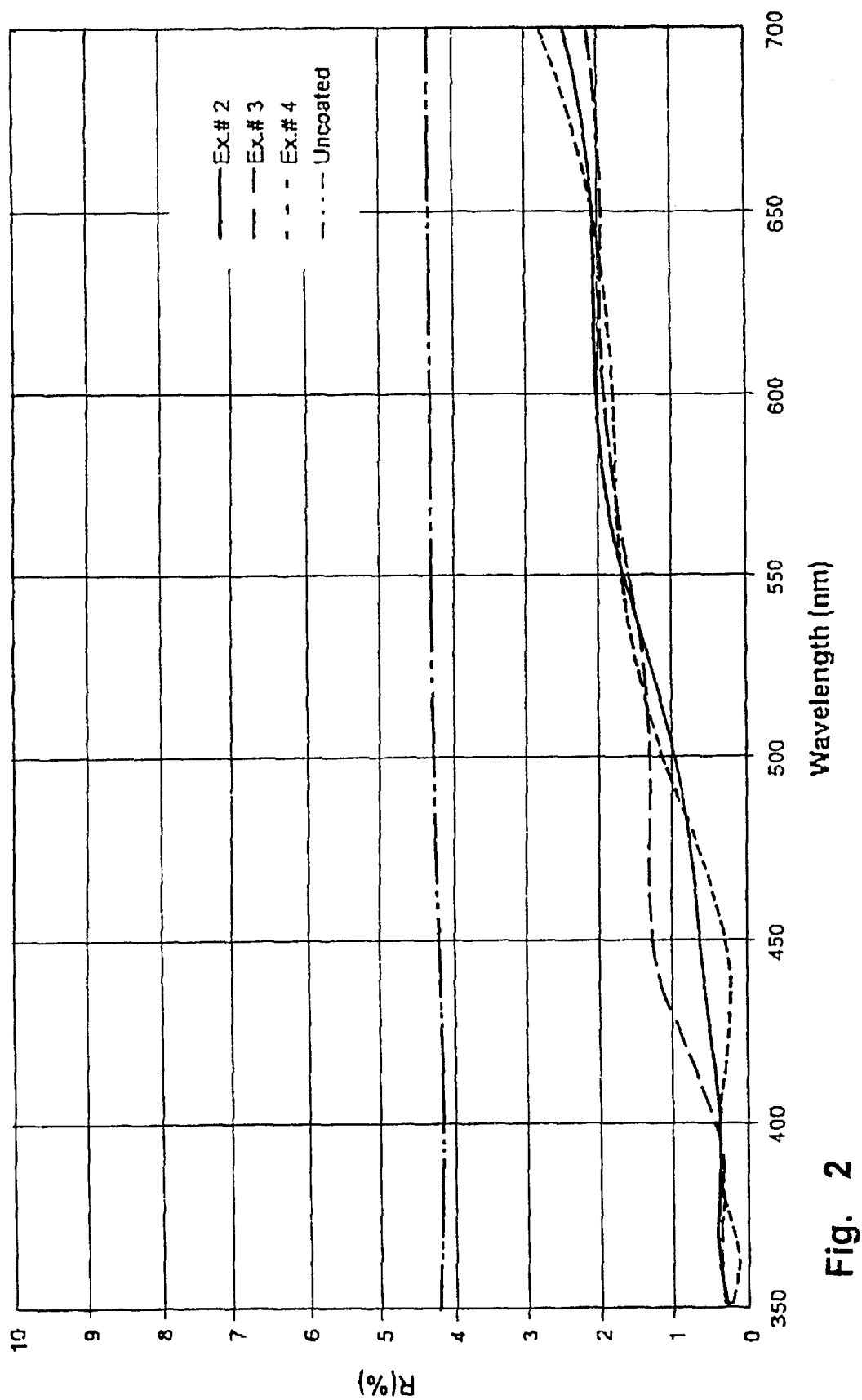
FIG. 2 illustrates the reflectance curves as a function of the wavelength for different photochromic substrates made of glass or plastic material: having different refractive indices, with an anti-reflection coating according to the present invention.

The results of the reflectance and transmittance measurements of the incident radiation achieved do not show substantial differences in respect of the previous Example 1, as shown in the curve illustrated in FIG. 2.

EXAMPLE 6

On 5 samples of BK7 glass panes (n=1.52 at 500 nm) and 5 samples of Corning glass lenses (n=1.525 at 500 nm)

having an opaque surface for the measuring of the reflectance, an anti-reflection coating made up of six overlapping layers, alternatively of $Pr_6O_{11}$ mixed with $xTiO_2$ (n=2.15) and $MgF_2$ (n=1.38) were applied.

The formation of the coating layers was carried out with a Satis 1200D deposition machine (Satis Vacuum AG), commercially available and equipped with a Leybold electronic gun having a 4 kW power supply and a system controlling the flow of oxygen by MKS.

The deposition parameters were the following:

| | |
|---|---|
| initial vacuum | $<2.0^{-6}$ mbar; |
| temperature before deposition | 300° C. |

The $Pr_6O_{11}+xTiO_2$ layers were deposited by regulating the power of the electronic gun to a value of approx. 50% of its maximum power and introducing oxygen with a flow of approx. 9 sccm.

The speed of deposition of the layers was set at a value of approx. 0.3 nm/s.

The $MgF_2$ layers were deposited by regulating the power of the electronic gun to a value of approx. 15% of its maximum power.

The speed of deposition of the layers was set at a value of approx. 1 nm/s.

At the end of the deposition we achieved on each of the samples an anti-reflection coating having the composition as illustrated in the following Table 3.

These samples then underwent the standard test to determine the reflectance curve as function of the wavelength in the range between 350 and 700 nm using a HITACHI Mod. 3501 spectrophotometer.

Figure 3:
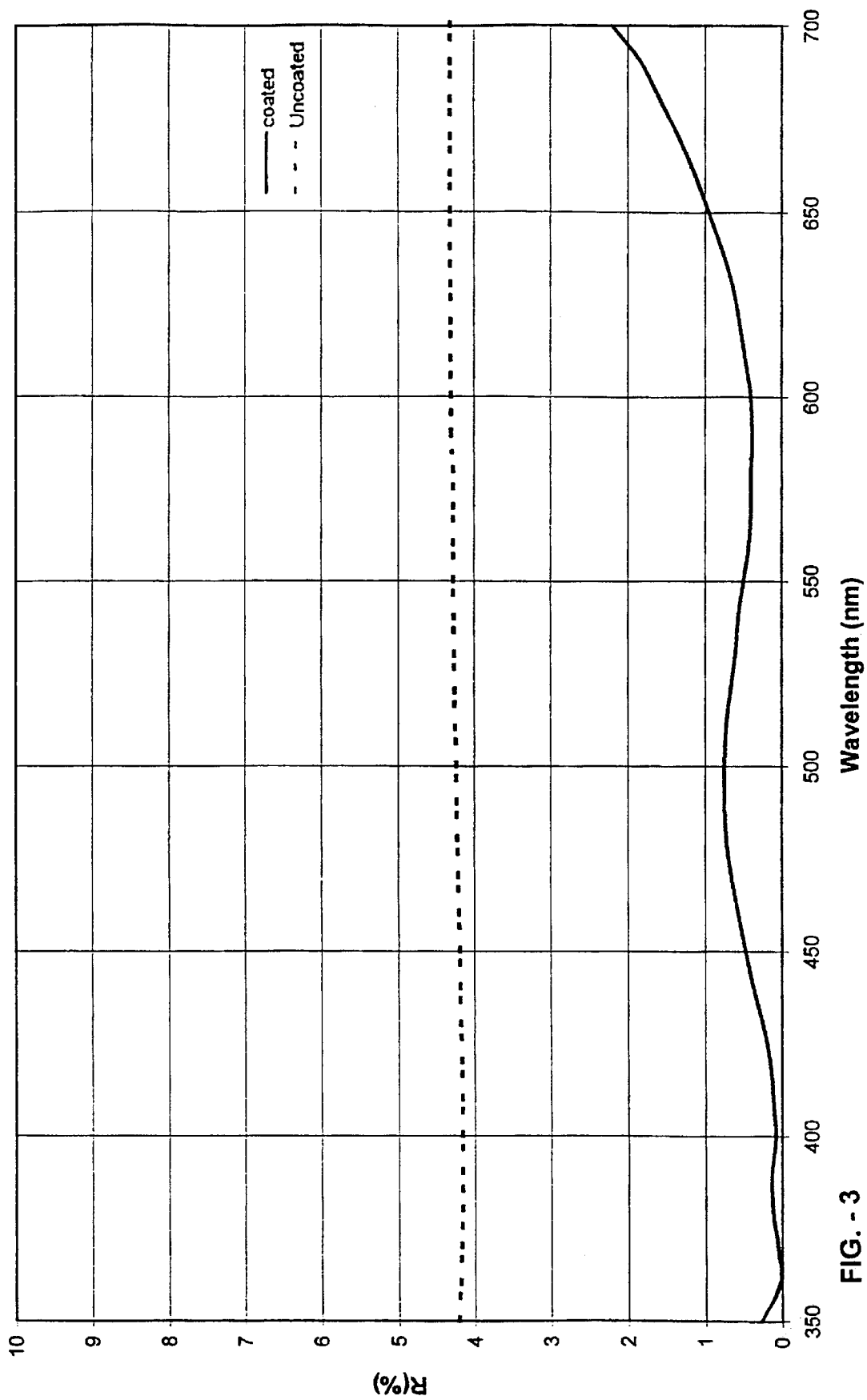
FIGS. 3 and 4 illustrate the reflectance curves as a function of the wavelength for different photochromic glass substrate with an anti-reflection coating according to the present invention.

The results of the measurement carried out are shown in FIG. 3 (uninterrupted line).

Moreover, in the above mentioned FIG. 3 the interrupted line curve illustrates the trend of the reflectance of photochromic BK7 glass and Corning glass samples, devoid of any anti-reflection coating.

EXAMPLE 7

On 5 samples of BK7 glass panes identical to those used in Example 1 above, an anti-reflection coating made up of one adhesion layer of $SiO_2$ and four overlapping layers, alternatively of $TiO_2$ and $Pr_6O_{11}$ (refractive index at 500 nm=2.15) and $SiO_2$ (refractive index at 500 nm=1.47) was applied.

The coating procedure and the machinery for the deposition used were the same as those stated in Example 1.

At the end of the deposition, on each of the samples, an anti-reflection coating having the composition as illustrated in Table 4 was achieved.

These samples then underwent the standard test to determine the reflectance curve as function of the wavelength in the range between 350 and 700 nm using a HITACHI Mod. 3501 spectrophotometer.

Figure 4:
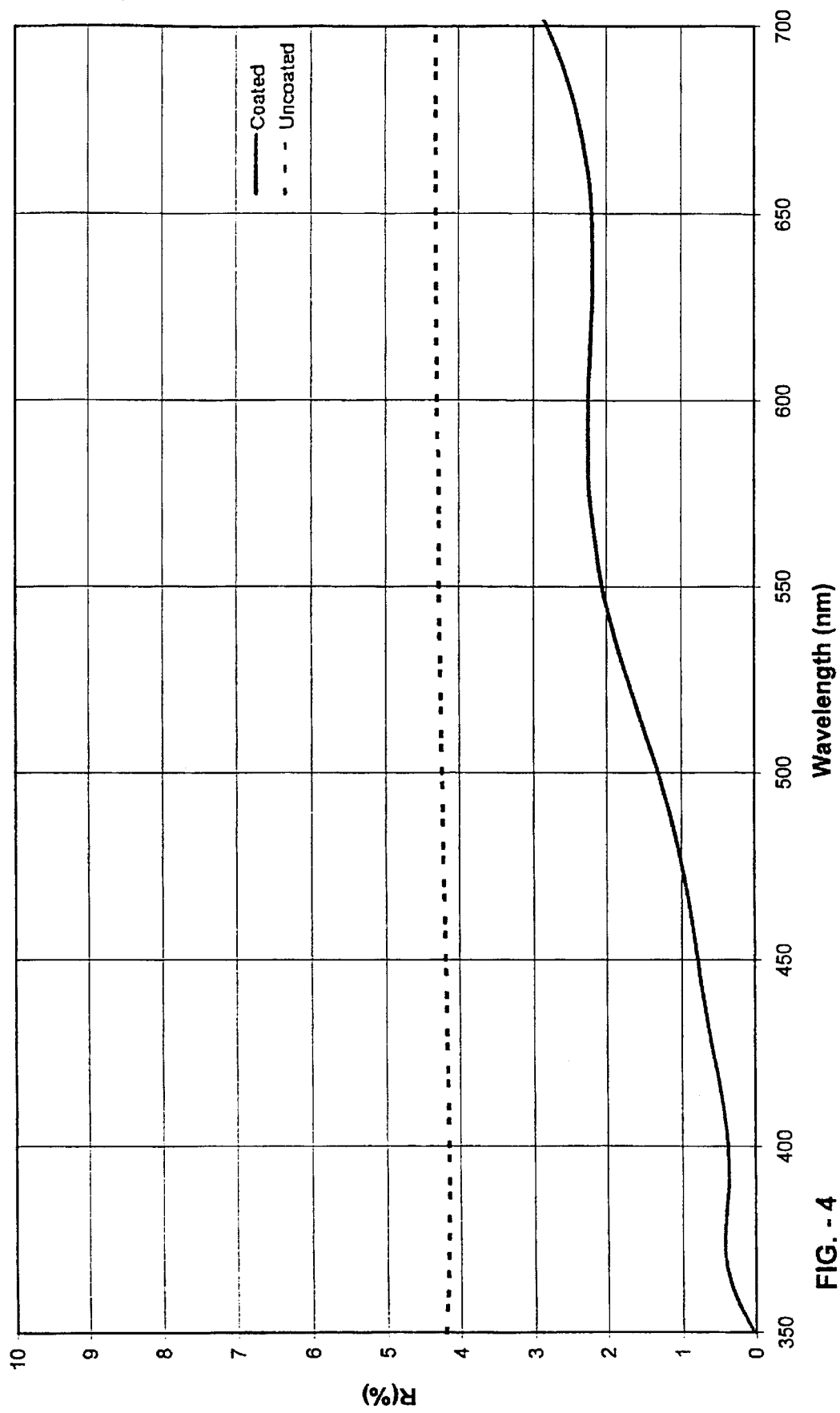

The results of the measurement carried out are shown in FIG. 4 (uninterrupted line).

Moreover, in the above mentioned FIG. 4 the curve, drawn as an interrupted line, illustrates the trend of the reflection factor of photochromic BK7 glass devoid of any anti-reflection coating.

After having examined the curves shown in the attached FIGS. 1 to 4, and in particular to those shown in FIG. 1, it is immediately evident how the layers of the present invention result in a reduced reflection factor of radiation both in the visible light range (400 to 700 nm), and in the range activating the photochromic composite material (350 to 400 nm).

As a clear contrast, the layers according to the known techniques show a marked increase of the reflection factor especially in this last range, with a marked reduction both in speed and darkening intensity of the lenses after exposure.

After examining the curve, it is evident that the substrate of the present invention shows a prompt photochromic response superior even to those offered by the same substrate devoid of any anti-reflection coating thanks to the increased transmittance in the range of photochromic activation (350 to 400 nm).

TABLE 1

| Layer | Physical thickness [nm] | Optical Thickness at 500 nm [nm] |
|---|---|---|
| $SiO_2$ | 169.2 | 249.9 |
| $Ti_3O_5$ | 15.5 | 37.0 |
| $SiO_2$ | 25.1 | 37.1 |
| $Ti_3O_5$ | 97.8 | 233.7 |
| $SiO_2$ | 68.6 | 101.4 |

TABLE 2

| Layer | Physical thickness [nm] | Optical Thickness at 500 nm [nm] |
|---|---|---|
| Cr | 1.0 | 2.9 |
| $Ti_3O_5$ | 10.6 | 23.6 |
| $SiO_2$ | 32.8 | 48.2 |
| $Ti_3O_5$ | 116.9 | 258.9 |
| $SiO_2$ | 86.3 | 126.8 |

TABLE 3

| Layer | Physical thickness [nm] | Optical Thickness at 500 nm [nm] |
|---|---|---|
| $Pr_6O_{11} + xTiO_2$ | 14.3 | 30.8 |
| $MgF_2$ | 34.0 | 46.9 |
| $Pr_6O_{11} + xTiO_2$ | 34.9 | 75.0 |
| $MgF_2$ | 28.2 | 38.9 |
| $Pr_6O_{11} + xTiO_2$ | 27.3 | 58.8 |
| $MgF_2$ | 88.8 | 122.5 |

TABLE 4

| Layer | Physical thickness [nm] | Optical Thickness at 500 [nm] |
|---|---|---|
| $SiO_2$ | 165.6 | 244.6 |
| $Pr_6O_{11} + xTiO_2$ | 15.5 | 32.4 |
| $SiO_2$ | 28.8 | 42.5 |
| $Pr_6O_{11} + xTiO_2$ | 112.3 | 235.8 |
| $SiO_2$ | 66.9 | 98.9 |

What is claimed is:

1. A transparent photochromic article including a transparent substrate including a photochromic material; and an anti-reflection surface coating thereon, produced with a plurality of overlapping layers incorporating, alternatively a first and a second material having respectively higher and lower refractive indices, the anti-reflection coating including a first layer including said first material having an optical thickness of about 20 to 40 nm;

a second layer including said second material having an optical thickness of about 40 to 55 nm;

a third layer including said first material having an optical thickness of about 65 to 85 nm;

a fourth layer including said second material having an optical thickness of about 30 to 45 nm;

a fifth layer including said first material having an optical thickness of about 50 to 65 nm; and a sixth layer including said second material having an optical thickness of about 110 to 135 nm, wherein the mean reflectance at the external surface is less than or equal to about 1% in the UV range.

2. A transparent photochromic article according to claim 1, wherein the first material has a refractive index of about 1.6 to 2.5.

3. A transparent photochromic article according to claim 1, wherein the second material has a refractive index of about 1.30 to 1.48.

4. A transparent photochromic article according to claim 1, wherein the transparent substrate is made of glass having a refractive index of about 1.5 to 1.9.

5. A transparent photochromic article according to claim 1, wherein the transparent substrate is made of plastic having a refractive index of about 1.3 to 1.7.

6. A transparent photochromic article according to claim 1, further including an intermediate layer between said substrate and said first layer.

* * * * *